United States Patent [19]

Tomlinson, III

[11] 4,111,524
[45] Sep. 5, 1978

[54] WAVELENGTH DIVISION MULTIPLEXER

[75] Inventor: Walter John Tomlinson, III, Holmdel, N.J.

[73] Assignee: Bell Telephone Laboratories, Incorporated, Murray Hall, N.J.

[21] Appl. No.: 787,329

[22] Filed: Apr. 14, 1977

[51] Int. Cl.$^2$ .............................................. G02B 5/14
[52] U.S. Cl. .............................. 350/96.19; 350/96.16
[58] Field of Search ............ 350/96 C, 96 W, 96 GN, 350/162 R, 96.19, 96.16; 250/227, 199

[56] References Cited

U.S. PATENT DOCUMENTS

| | | | |
|---|---|---|---|
| 3,532,429 | 10/1970 | Hughes et al. | 356/97 |
| 3,633,034 | 1/1972 | Uchida et al. | 350/96 GN |
| 3,845,294 | 10/1974 | Indig et al. | 250/199 |
| 3,863,063 | 1/1975 | Indig et al. | 250/199 |
| 3,883,223 | 5/1975 | Hudson | 350/96 C |
| 3,937,557 | 2/1976 | Milton | 350/96 C |
| 4,067,642 | 1/1978 | King et al. | 350/96.19 |

OTHER PUBLICATIONS

Stigliani et al. "Wavelength Division Multiplexing in Light Interface Technology" IBM Federal Systems Div. New York, Mar., 71.

*Primary Examiner*—John K. Corbin
*Assistant Examiner*—Stewart Levy
*Attorney, Agent, or Firm*—Daniel D. Dubosky

[57] ABSTRACT

A multiplexer/demultiplexer for optical fibers is disclosed that features a reflection diffraction grating and a graded refractive index rod in a rugged, compact assembly having low insertion loss and low crosstalk.

4 Claims, 4 Drawing Figures

WAVELENGTH DIVISION MULTIPLEXER

BACKGROUND OF THE INVENTION

Although the idea of wavelength division multiplexing has been extensively developed at lower frequencies, and has previously been suggested for optical frequencies for use with optical fibers, the prior art has not been able to solve the problems associated with producing a practical multiplexer. In particular, it was not known how to achieve a clean separation of adjacent channels (i.e., to reduce crosstalk), how to reduce the insertion loss to an acceptable level or how to make a multiplexer small enough, to be compatible with the other components of an optical fiber system.

There is prior art that discloses a multiplexed communications system that employs a prism for wavelength separation (U.S. Pat. No. 3,845,294 issued Oct. 29, 1974 to G. S. Indig et al.). There is also a pulse-shaping optical system that employs a reflection diffraction grating for wavelength separation but does not provide for multiplexing (U.S. Pat. No. 3,863,063 issued Jan. 28, 1975 to G. S. Indig et al.). It would be desirable to have a smaller device and a lower insertion loss than is available with these systems.

The closest prior art considered the use of diffraction gratings and rejected them as providing too much attenuation. "Wavelength Division Multiplexing in Light Interface Technology" by R. J. Stigliani et al in Report AD-721 085, available from the National Technical Information Service, addresses the problem of designing a multiplexer. They conclude that diffraction gratings are impractical, thus teaching away from the present invention. Their preferred method involves a combination of narrowband generators and narrowband receivers.

SUMMARY OF THE INVENTION

The invention relates to a wavelength division multiplexer/demultiplexer that involves a reflection diffraction grating and an optical device for collimating and focusing.

In accordance with the present invention a wavelength division multiplexer or demultiplexer is provided by combining an optical focusing device with a reflection diffraction grating. In the multiplexer embodiment of the invention, the optical focusing device collimates the light from a plurality of optical sources, each emitting in a different wavelength range, and couples these collimated light beams to the reflection diffraction grating. The grating is positioned such that the reflected collimated light is coupled back into the optical focusing device which in turn couples this light into an output optical fiber. In the demultiplexer embodiment of the invention, the optical focusing device collimates light from an input optical fiber and couples this light to the reflection diffraction grating. The grating in turn reflects a plurality of collimated beams of light, each within a different wavelength range, into the optical focusing device which in turn couples each of the beams to be corresponding output optical device.

One feature of the invention is the use of a graded-refractive-index (GRIN) rod as the optical focusing device to provide a high numerical aperture for efficient light transmission into and out of optical fibers while at the same time providing low-distortion focusing.

Another feature of the invention is a reflection diffraction grating that provides low-loss coupling into and out of a plurality of optical channels.

Yet another feature of the invention is that the elements of the apparatus can be encapsulated in an index-matching material for greater efficiency and also for added durability.

Yet another feature of the invention is that an apparatus may be made much smaller than an apparatus that employs a prism, and may be comparable in size with other components of an optical-fiber system.

Yet another feature of the invention is that the simple components involved are readily adapted to inexpensive mass production.

DETAILED DESCRIPTION

Figure 1A:
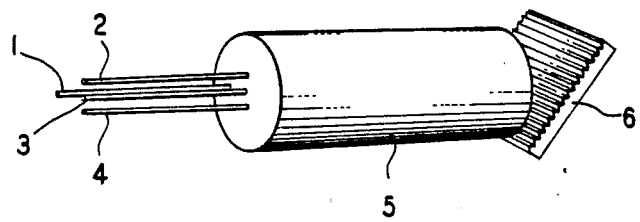
FIG. 1 shows in partially pictorial, partially schematic form a three-channel multiplexer/demultiplexer.
Figure 1B:
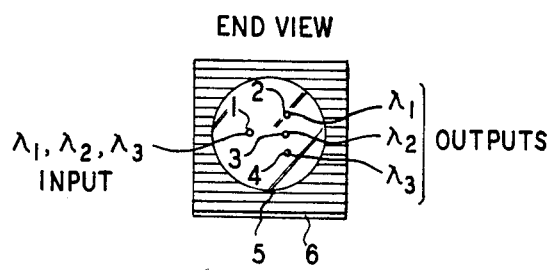

FIG. 1 shows a three-channel multiplexer/demultiplexer according to the present invention. Since multiplexing and demultiplexing are essentially symmetric operations, the same device will function in either capacity. For simplicity we shall refer to devices as multiplexers, except where it is necessary to distinguish between the multiplexing and demultiplexing functions. In performing the multiplexing functions, the requirements for concentration of power at a particular angle (for going from one of several inputs to a common output) are less demanding than for demultiplexing, because in multiplexing, stray radiation is merely lost while in the demultiplexing stray radiation may give rise to crosstalk between channels.

In operation as a demultiplexer (FIG. 1), radiation in one or more frequency ranges emerges from fiber 1, the end of which is located in the focal plane of optical focusing device 5 (either a multielement lens or a GRIN (graded refractive index) rod. The radiation is collimated by focusing device 5 and emerges as a parallel beam directed at diffraction grating 6, preferably a blazed plane diffraction grating. Diffraction grating 6 reflects back several beams, one for each frequency range present, into focusing device 5, which focuses these beams into the corresponding output optical fibers 2, 3, or 4.

The optical element may not be a simple lens because simple lenses of sufficiently large numerical aperture (which is needed for low insertion loss), have excessive spherical aberration that leads to poor coupling and to crosstalk. The GRIN rod is made of a cylinder of glass or plastic, the index of refraction of which is highest at the axis and decreases appropriately at the square of the distance from the axis. The properties of GRIN rods are well-known in the art. See, for example, "Interferometric Measurements of SELFOC Dielectric Constant Coefficients to Sixth Order", by E. G. Ranson et al., *IEEE Journal of Quantum Electronics*, QE-9, 1114, (1973). The parameters of the grating (number of grooves/mm and blaze angle) are chosen in connection with the frequency separation of channels, the physical separation of output fibers, and the effective focal length of the focusing element to achieve best compromise between efficient coupling and crosstalk.

Figure 2:
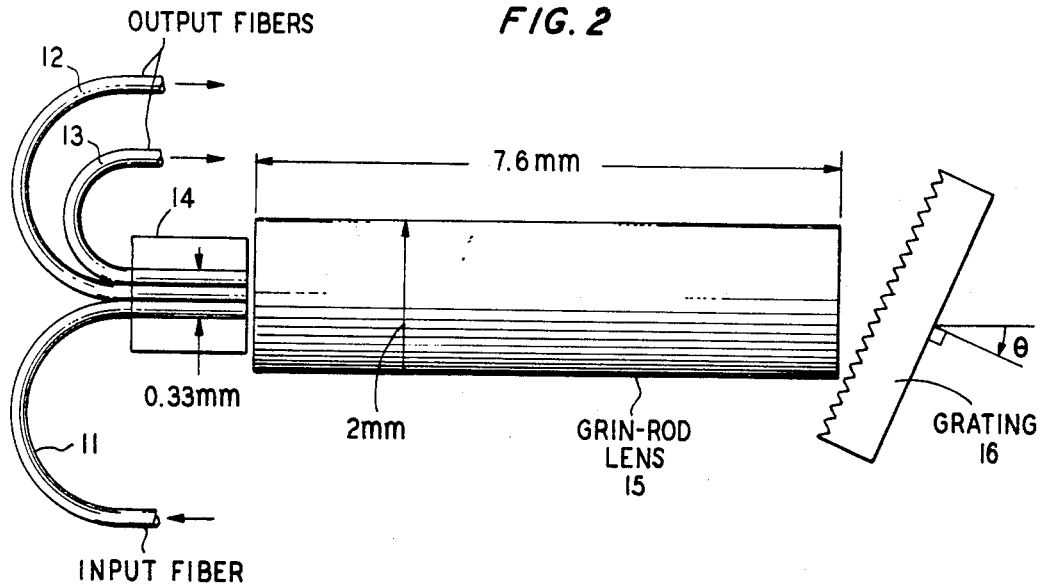
FIG. 2 shows in partially pictorial, partially schematic form an embodiment in which the principle of operation was demonstrated.

The principle of operation and efficiency of the invention has been demonstrated in the embodiment shown in FIG. 2, which is a two-channel demultiplexer. The input 11 and two output fibers 12 and 13 were one-meter long multimode graded index fibers with a core diameter of 55 μm, a numerical aperture of 0.2, a cladding diameter of 110 μm and a protective plastic jacket. The plastic jackets were stripped off the last centimeter of the fibers, and the three fibers were epoxied together between two pieces of glass, in a side-by-side parallel array in holder 14 with a center-to-center spacing of the fibers of 110 μm. The ends of the fibers in holder 14 were then polished flat and perpendicular to the fiber axes. In addition to holding the fibers in place, the epoxy also serves as a stripper to remove light traveling in the cladding of the fibers.

GRIN rod 15 was 2 mm in diameter and 7.3 mm long, having an effective focal length of $3.15n$ mm, where $n$ is the refractive index of the medium at the output face (Model SSL-13, made by Nippon Electric Company).

Blazed-plane diffraction grating 16 was a standard dye-laser grating with 1200 grooves/mm which was blazed at 17.5° for 500 nanometers (Model TF-17 by PTR Optics Corporation). A production model multiplexer would, of course, be designed for an optimum match to the particular apparatus. With the present embodiment, the wavelength separation of the two channels was 27 nanometers.

The grating was mounted on a multiaxis positioner with three rotational and two translational degrees of freedom (not shown). In a production model, the space between the GRIN rod and the grating could be filled with an index-matching material possibly in the form of a solid dielectric spacer glued to the lens and the grating with a transparent optical cement. For testing purposes, that space remained in air. Glycerol was used as an index-matching fluid between the fiber array and the GRIN rod. In a production model, transparent optical cement would probably be used to secure the fiber array to the GRIN rod.

Figure 3:
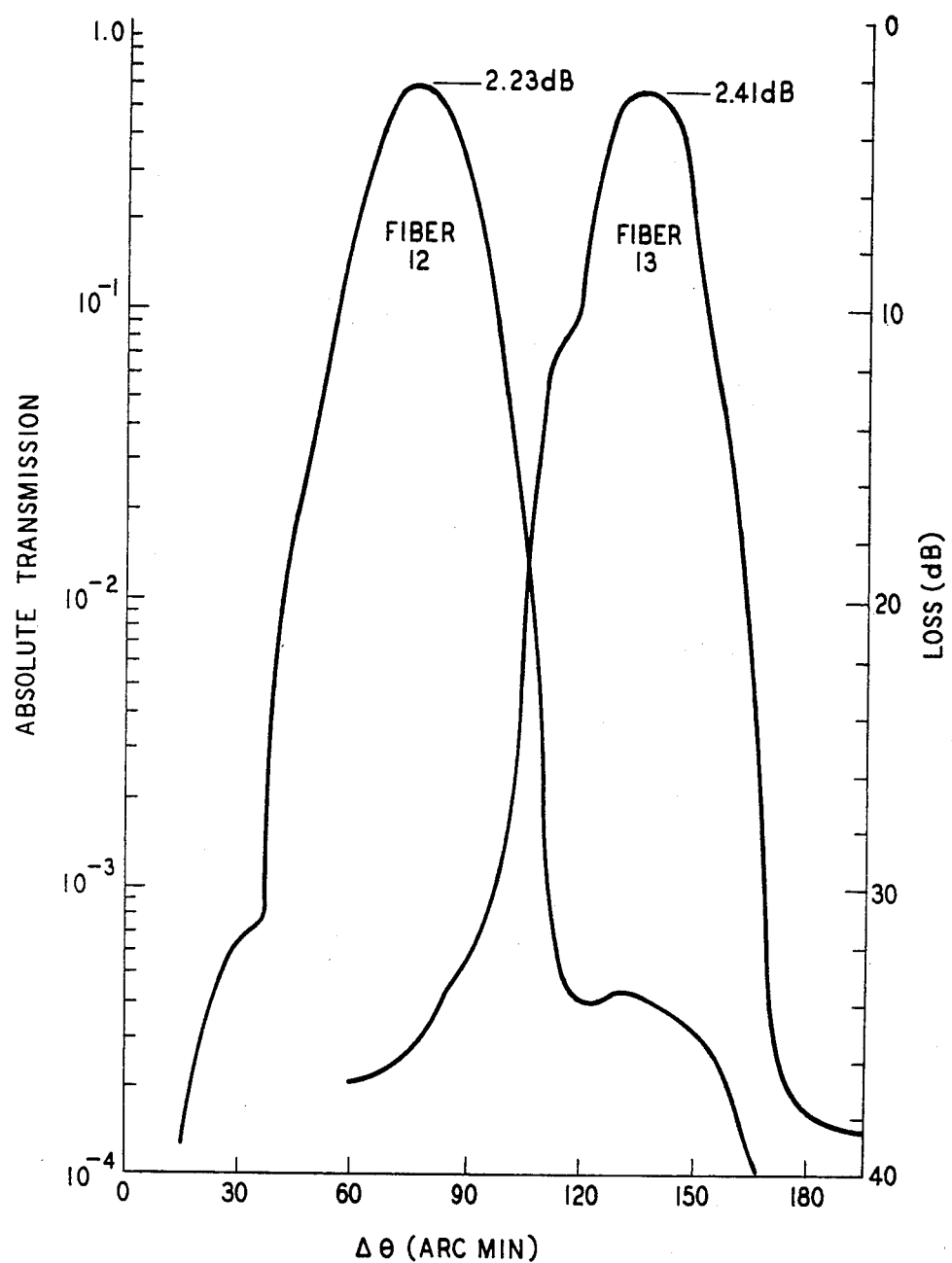
FIG. 3 shows a graph of transmitted power versus grating angle for the embodiment shown in FIG. 2.

The device was tested both by using a fixed-frequency source and rotating angle $\theta$ as shown in FIG. 3 or equivalently, keeping the grating fixed and varying the input frequency. In the first test, the beam from a He-Ne laser ($\lambda = 633$ nanometers) was expanded to a diameter of about 7 mm, and then focused onto the end of the input fiber with a microscope objective (numerical aperture = 0.25) so as to overfill the numerical aperture of the fiber. The light output from each of the two output fibers was then measured as a function of the grating angle. The result is shown in FIG. 3, where the output light from fibers 12 and 13 is plotted as a function of the grating angle. The figures at the peaks of the two curves show the absolute insertion loss of the multiplexer, which was measured by removing GRIN rod 15 and grating 16 and using the same detector that was used for the output measurements to measure the power entering the GRIN rod.

At their peaks, the two channels have transmissions of 60 percent and 57.5 percent, or insertion losses of 2.23 dB and 2.41 dB, respectively. At the peak of each channel, the transmission for the other channel is down by more than 30 dB, demonstrating the low insertion loss and low crosstalk required for a practical device. It is calculated from the measured curves that a wavelength error of 10 percent of the interchannel spacing would increase the insertion loss by only about 0.5 dB.

A test was also conducted by varying the input frequency and keeping the grating fixed. This test confirmed the results of the fixed-frequency test, within the experimental limits.

The embodiments illustrated have used optical fibers as inputs and outputs. Semiconductor lasers could also be used as inputs for a multiplexer and solid state detectors could be used in the output channels of a demultiplexer, mounting them adjacent to the GRIN rod to eliminate the need for the extra fibers. These elements would have different physical dimensions than fibers, and different spacing would be required.

If it is desired to space the fibers at a greater separation than was used for this embodiment or to orient them at different angles, a different spacing fixture could be used, the details of which fixture being obvious to those skilled in the art in view of the development of techniques for splicing optical fiber cables. The purpose of greater physical separation of fibers would be to reduce crosstalk between channels. The purpose of orienting fibers at different angles would be to increase coupling efficiency. Since the input and output fibers are in an array about the optic axis of GRIN rod 5 and since the collimated beam emerging from the GRIN rod should be parallel, the input and output rays should be at finite angles with respect to the optic axis for the most efficient coupling. FIG. 1 illustrates an embodiment in which the fibers are noncoplanar, that might employ finite angles.

What is claimed is:

1. A wavelength division multiplexer comprising:
   an output optical fiber,
   a graded refractive index rod optical focusing device having a first face and a second face,
   a plurality of optical sources, each transmitting input light in a different frequency range into said first face, in such a manner that said input light is collimated by said graded refractive index rod optical focusing device, so that a plurality of beams of collimated light emerge from said second face, and
   a blazed plane reflection diffraction grating for reflecting said beams of collimated input light back into said second face at angles such that said graded refractive index rod optical focusing device focuses said collimated beams of input light into said output optical fiber.

2. A wavelength division multiplexer according to claim 1 in which said optical sources are optical fibers.

3. A wavelength division demultiplexer comprising:
   a plurality of output optical devices for receiving light within one of a plurality of separate frequency ranges,
   a graded refractive index rod optical focusing device having a first face and a second face,
   an input optical fiber transmitting input light within at least one of said frequency ranges, into said first face in such a manner that said input light is collimated by said graded refractive index rod optical focusing device, so that a beam of collimated input light emerges from said second face, and
   a blazed plane reflection diffraction grating for reflecting back at least one reflected collimated beam at a frequency dependent angle corresponding to one of said frequency ranges such that said graded refractive index rod optical focusing device focuses said reflected collimated beam into the optical output device the frequency range of which includes the frequency of said reflected collimated beam.

4. A wavelength division demultiplexer according to claim 3 in which said output optical devices are optical fibers.

* * * * *